United States Patent [19]
Kouth et al.

[11] 3,763,710
[45] Oct. 9, 1973

[54] DEVICE FOR LIMITING ROTATION
[75] Inventors: Herbert Kouth, Schoneck-Kilianstadten; Fritz Marr, Offenbach/Main; Rudolf Roos, Bischofsheim/Hanau, all of Germany
[73] Assignee: H. T. Golde GmbH, Frankfurt/Main, Germany
[22] Filed: July 14, 1972
[21] Appl. No.: 272,068

[30] Foreign Application Priority Data
July 15, 1971 Germany.................. P 21 35 359.2

[52] U.S. Cl............ 74/10.2, 296/137 G, 296/137 H
[51] Int. Cl............................................. F16h 35/18
[58] Field of Search........................... 74/526, 10.2; 296/137 G, 137 E, 137 H

[56] References Cited
UNITED STATES PATENTS
2,991,662  7/1961  Werner............................ 74/10.2 X
3,411,366  11/1968  Leto.................................... 74/10.2

*Primary Examiner*—Milton Kauffman
*Assistant Examiner*—Frank H. McKenzie, Jr.
*Attorney*—David Toren et al.

[57] ABSTRACT

For limiting the rotational or angular movement of a drive spindle about its axis, such as in a rotary drive for the sliding roof of a motor vehicle, abutments or stops are associated with the driving spindle and with a slide movably displaceable relative to and transversely of the drive spindle, for effecting the limiting action. The drive spindle extends through a housing and the slide is movably positioned within the housing. An eccentric disk is fixed to the drive spindle and a ring is rotatably mounted on the disk and has teeth on its circumferential periphery. An arcuate portion of the teeth on the ring intermesh with teeth formed in the housing. Due to the eccentricity of the disk and ring, during each 360° turn of the drive spindle there is a displacement of the ring relative to the housing. Abutment surfaces are provided on the ring extending toward the slide. The slide is displaceable between two positions and has a pair of abutments so that in each of its positions one of its abutments is located in the path of the abutment surfaces on the ring. When the abutment surface on the ring contacts the abutment on the slide further angular movement of the drive spindle in a particular direction is prevented.

10 Claims, 4 Drawing Figures

DEVICE FOR LIMITING ROTATION

SUMMARY OF THE INVENTION

The present invention is directed to a device for limiting the number of turns or revolutions of a rotary member, such as the driving spindle in a rotary drive for the sliding roof of a motor vehicle, and, more particularly, it is concerned with the arrangement of a slide for selectively positioning abutment means within a housing.

In a device of the kind to which the present invention is directed, a disk is rigidly secured on and extends transversely of a drive spindle and the axis of the disk is offset or eccentric to the axis of the spindle. A ring is rotatably mounted on the circumferential periphery of the disk and the outer circumferential periphery of the ring is provided with gear teeth. The device includes a housing disposed laterally about a part of the drive spindle and providing a cylindrically-shaped surface laterally enclosing the ring. The cylindrically shaped surface is concentric to the axis of the drive spindle and, as a result, is offset relative to the circumferential periphery of the ring. Gear teeth are formed in the cylindrically shaped surface and the radius of the dedendum circle of the gear teeth on the cylindrically shaped surface is larger than the radius of the addendum circle of the gear teeth on the ring by an amount which corresponds to the eccentricity of the disk relative to the axis of the drive spindle. As a result, only a portion of the teeth on the periphery of the ring are in intermeshing engagement with the teeth on the cylindrically shaped surface of the housing. During each complete turn of the drive spindle, the ring moves a certain distance relative to the housing. The ring and the housing each have cooperating abutment or stop means for halting the angular movement of the drive spindle after a predetermined number of turns or revolutions have been made.

A device of this type is disclosed in U.S. Pat. No. 2,991,662, issued July 11, 1961, and has proven to be especially suitable as the drive for sliding roofs in motor vehicles. The characteristic of the device which makes its use desirable, is that a reliable limitation on the number of turns of a drive spindle can be achieved at insignificant cost and the parts required can be accommodated, without any additional space requirements, in the body or housing which customarily encloses a portion of the drive spindle. As is known from the prior art device, the limitation on the number of revolutions of the drive spindle serves to limit the path through which a sliding roof travels while avoiding any overloading of the transmission or gearing when the end position of the sliding roof has been reached. Further, by means of this device, it is possible to prevent the rigid sliding roof, and particularly its rear edge, from striking the roof frame with excessive force at the end of its travel.

In U.S. Pat. No. 3,507,537, issued Apr. 21, 1970, another sliding roof construction is disclosed in which the sliding roof or cover can be selectively raised in the manner of a inwardly hinged venting flap by lifting the rear edge of the cover or by displacing it out of the roof opening into a receiving space below the roof. In this more recent sliding roof construction, it is desirable to construct the drive so that it can perform both the raising function and the sliding function. To perform both functions, a single actuating element is used, such as a handcrank, if a manually operated drive is to be employed. Therefore, it is the primary object of the present invention to provide a simply constructed device for limiting both the sliding movement and the raising movement of a sliding roof. In other words, it is the purpose of the present invention to provide a device which limits the number of turns of a drive spindle used for effecting two different courses of movement.

In accordance with tht present invention, abutment or stop members for the housing are positioned on a slide which is displaceably mounted in the housing for movement in a direction transverse of the drive spindle. By locating the slide between two positions, it is possible to locate different ones of the abutment members in the path of the abutment means located on the ring. In this manner, the limitation caused by the engagement of the abutment means can be released so that the driving movement can be continued in the same rotational direction. In this way and in a very simple manner, the number of turns can be multiplied or repeated in a stepwise manner or can be reduced in a stepwise manner until the desired limit on the movement has been reached. Moreover, if the slide is angularly adjustable about the axis of the driving spindle, the limiting action can be provided without any stepwise action or in variable steps or progressions.

However, the preferred embodiment of the present invention, that is for limiting the number of turns or revolutions of the drive spindle for the drive of a sliding roof, operates only with a linearly adjustable slide.

If the device is used in carrying out the two different movements of a sliding roof construction, preferably, a pair of abutment members are provided on the slide each disposed on an opposite side of the axis of the drive spindle so that one of the abutment members is always situated in the path of movement of the abutment means on the ring. Further, the slide is provided with an oblong hole or slot for permitting tht displacement of the slide relative to the drive spindle which extends through the slide. Accordingly, it is possible to limit the number of turns of the drive spindle for each of the different movements effected by the sliding roof. Additionally, if two angularly spaced abutment surfaces are provided on the ring, as is preferred in accordance with the invention, then a limitation of the number of turns can be afforded in both of the rotational directions of the spindle. By the selective construction and arrangement of the abutment means on the ring and/or the housing, a number of different stop positions can be provided for the drive spindle.

In a sliding roof construction, such as disclosed in U.S. Pat. No. 3,507,537, it is sufficient if only two stop arrangements are provided for the drive spindle, that is one for the end of the closing movement of the sliding roof and the other for the end of the tilting movement of the sliding roof, while the limitation on the opening displacement can be provided by the engagement of the cover with the frame of the roof and, with regard to the raising movement, by the lifting means employed, for example, the lifting linkage. To prevent any problems by displacement of the slide prior to the engagement of the different abutments, the slide, in a particularly advantageous embodiment of the invention, is blocked from displacement because the abutment surfaces on the ring are provided by the two end surfaces of an arcuately extending blocking rib which is concentrically mounted on the ring and extends for an angular portion of the ring. The blocking rib prevents any premature engagement with the inactive abutment member on the slide.

To assure that the slide is always maintained in one of its two positions, a spring is positioned in the housing and contacts the slide for holding it in either of the positions in which it is located. To provide the necessary locking or holding action between the slide and the spring, the slide is provided with a V-shaped cam extending outwardly from one of the sides of the slide which extends in the direction of its movement. Within a recess in the housing located on the same side of the slide as the cam, a stirrup spring is positioned with a projection shaped in the same manner as the cam for engagement with the cam so that the slide is held or biased in whichever position it is located. With the apex of the projection on the stirrup spring directed toward the apex of the cam on the slide and with the projection on the spring located in the middle of the path of movement of the slide, if the slide is not fully displaced into either of its two positions, the spring will bias the slide into one of its end positions so that only one course of movement of the sliding cover can be effected.

For displacing the slide between its two positions, a recess is provided in one of the sides which extends in its direction of movement. To displace the slide, a lever is pivotally mounted on the housing with one end extending into the recess on the slide and the other projecting outwardly from the housing. Preferably, a hat-shaped actuating button is positioned on the end of the lever located outwardly of the housing and the button is arranged so that in each of the positions of the slide it is in surface contact with the housing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
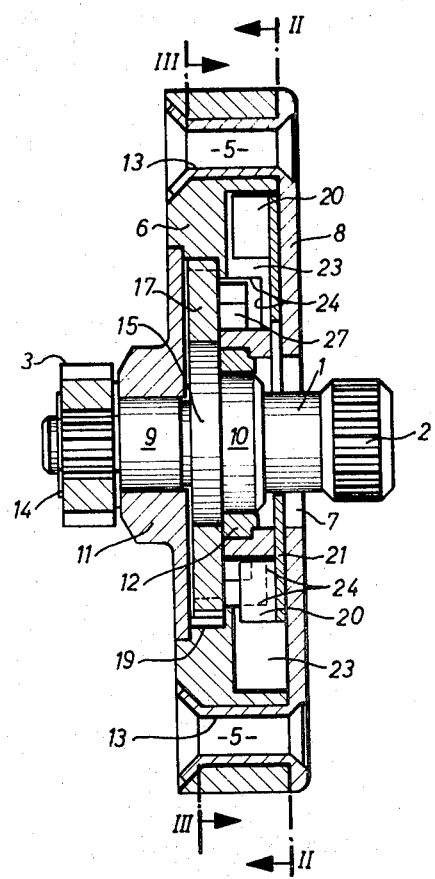
FIG. 1 is a vertical sectional view through a device embodying the present invention.

In FIG. 1 a drive spindle 1 is shown extending through a housing 6 with one end 2 of the spindle serrated for receiving a handcrank, not shown, for manually turning the spindle. Secured to the opposite end of the spindle is a driving pinion 3. In a known manner, the driving pinion 3 is engaged on two opposite sides with a pair of movably guided threaded cables, not shown, for actuating a sliding roof cover. Bores 5 extend through the housing for mounting the device on a sheet metal part of a vehicle body. Further illustration and description of the cable drive for sliding grooves is considered unnecessary, since such a drive is well known and, in addition, the present invention does not relate to such a cable drive. The housing 6 includes a cover 8 having a recess 7 through which the driving spindle 1 extends. The drive spindle 1 is rotatably mounted within the housing with the portion 9 adjacent the drive pinion 3 mounted in a bearing cover 11 fitted within the housing 6 and with another portion 10 supported in a bearing ring 12. The bearing ring 12 is seated within the housing.

Figure 3:
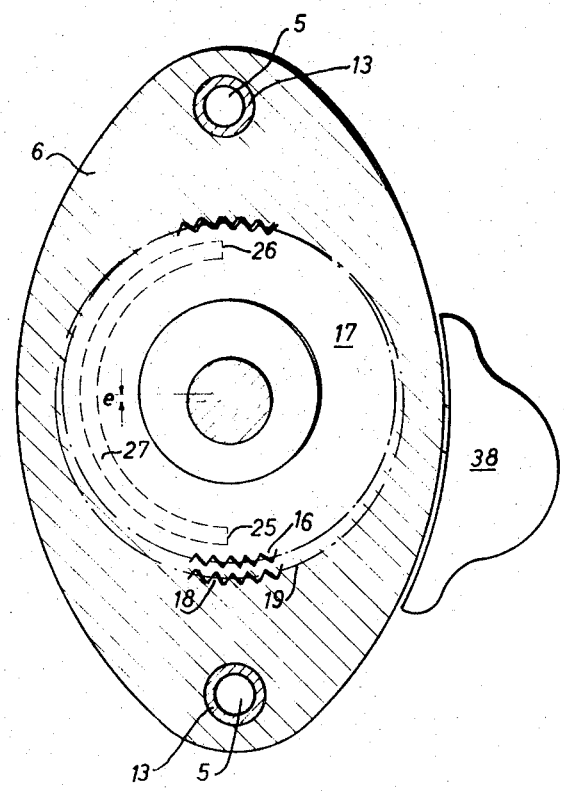
FIG. 3 is a view taken along line III—III in FIG. 1.
Figure 4:
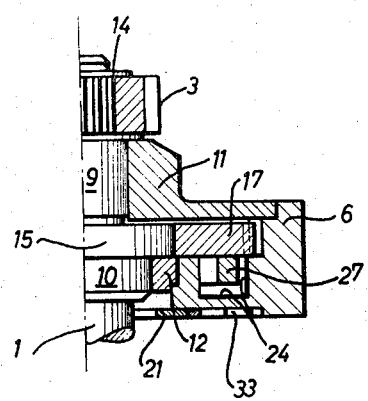
FIG. 4 is a view taken along line IV—IV in FIG. 2.

The housing 6 and its cover 8 are formed of a diecast metal and are rigidly connected together by means of bushings 13 formed integral with the cover and extending through the bores 5 in the housing. The inner surfaces of the bushings define the surfaces of the bores 5. The ends of the bushings spaced from the cover are deformed into engagement with the housing. Bearing cover 11 is fitted into the surface of the housing opposite the cover 8 and is secured, such as by caulking. On the end of the drive spindle 1 adjacent the driving pinion 3, a disk 14 is connected in a groove on the shaft and fixes the axial position of the pinion. On the spindle 1 between portions 9 and 10, an eccentric disk 15 is rigidly connected to the spindle and, preferably, is formed integrally with the spindle. In FIG. 3, the eccentricity $e$ between the axis of the disk and the axis of the spindle 1 is indicated. Rotatably mounted on the circumferential periphery of the disk 15 is a ring 17 which has gear teeth 16 extending about its outer circumferential periphery. Within its interior, the housing 6 has a cylindrically shaped surface 19 laterally enclosing the ring 17. Gear teeth 18 are formed in the cylindrically shaped surface 19 and, as shown in FIG. 3, a portion of the gear teeth 16 and 18 are in intermeshed engagement. The radius of the dedendum circle of the gear teeth 18 on the cylindrical surface 19 is larger than the radius of the addendum circle of the gear teeth 16 on the ring 17 by an amount which corresponds substantially to the extent of the eccentricity of the disk 15 to the axis of the drive spindle 1. Accordingly, in the embodiment shown in the figures, there are 35 gear teeth 16 on the ring and 36 gear teeth 18 on the cylindrically shaped surface 19, that is there is one more gear tooth 18 than gear teeth 16.

The device, as described thus far, operates in the following manner: as the drive spindle and the other parts rigidly secured to it are rotated in one or the other direction about the axis of the spindle, the ring, rotatably mounted on the eccentric disk 15 with a portion of its gear teeth 16 in contact with the stationary counter gear teeth 18 moves within the housing 6. Since the number of teeth between the two sets of gear teeth differ by one tooth, the relative position between the ring 17 and the cylindrically shaped surface 19, after one revolution of the drive spindle 1, is displaced, by an amount equal to one tooth spacing, in the circumferential direction. The ring 17 turns in the direction opposite to the rotation of the drive spindle, however, at a lesser angular speed. Accordingly, after a number of complete turns of the drive spindle, which number can be exactly determined and calculated, the arrangement of abutments or stops on the ring and corresponding stationary abutment members within the housing result in a blockage of the spindle so that no further turning action in a particular direction can be effected. When the spindle 1 is prevented from turning, the driving pinion 3 can no longer transmit movement to the parts associated with it and the movement of such parts is discontinued.

Figure 2:
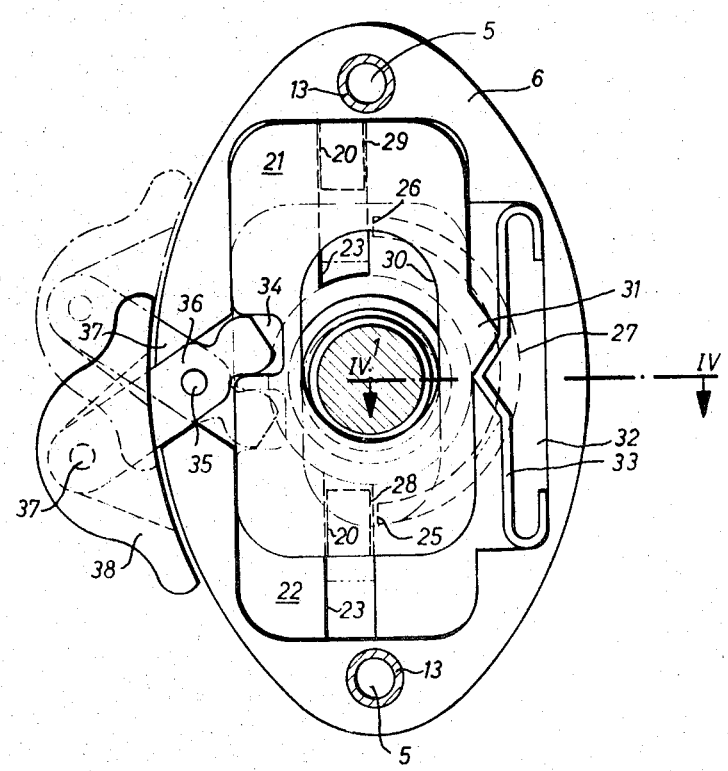
FIG. 2 is a view taken along line II—II in FIG. 1.

As can be seen in FIGS. 1 and 2, a flat slide 21 is positioned within a recess 22 formed in the housing 6 with the recess and the slide having corresponding rectangular shapes so that the recess 22 limits the displacement or path of movement of the slide 21 relative to the stationary housing 6. The slide 21 has a pair of abutment members 20 extending from the slide in the direction of the ring 17. Slots 23 are provided in the housing for affording the movement of the abutment members 20. Within the housing 6, spaced axially from the cylindrically shaped surface 19 and concentric with the axis of the spindle 1, is an annular channel 24. The slots 23 through the housing open into the annular channel 24 so that the abutment members 20 can be positioned within the channel. The channel 24 forms a path of movement for the abutment means associated with the ring 17.

As shown best in FIG. 3, the abutment means associated with the ring 17 are provided by the two end faces 25, 26 of the arcuately shaped blocking rib 27 which is secured on the face of the ring directed toward the cover 8. The rib 27 projects from the ring into the annular channel 24 and passes through the channel as the ring moves relative to the housing. In limiting or blocking the rotation of the driving spindle 1, the abutment surface 25 cooperates with the surface 28 on one of the abutment members 20 of the slide, while the abutment surface 26 is associated with the surface 20 on the other abutment member 20. Accordingly, displacement of the slide within the housing is possible only if the surfaces 25, 28 (as shown) or the surfaces 26, 29 are in engagement with one another. In any other position of the ring 17 relative to the housing 6, the rib 27 provides a blockage across the slots 23 preventing the movement of the abutment members 20 into and out of the respective portions of the annular channel 24. As viewed in the vertical position in FIG. 2, the slide 21 can be moved downwardly within the recess 22 relative to the housing 6 so that the rotational direction of the ring 7 previously blocked by the engagement of the surfaces 25, 28 is again clear corresponding to the opposing rotational direction of the spindle 1. If the device is to be used as described above, the necessity for releasing the blockage occurs when the roof cover has been pushed into its closed position and, subsequently, with the same crank direction, is to be raised or lifted, or when the lifted or raised cover during the folding down movement, in which the crank is turned in the opposing direction, has reached its end position and, subsequently, with the same crank direction the cover is pushed under the stationary roof part for opening the roof. The slide 21 has an elongated slot 30 through which the drive spindle extends for permitting the movement of the slide relative to the spindle. One of the sides of the slide, extending in the direction of its movement, has an outwardly projecting cam 31 which cooperates with a stirrup spring 33 engaged within a recess portion 32 in the housing 6, the recess portion forms an extension of the recess 22. Due to the cooperation between the slide 21 and the stirrup spring 33, it is only possible for the slide to assume one of two positions, that is the position as shown in FIG. 2 with the slide in contact with the upper end of the recess 22 or the position shown in dot-dash lines in FIG. 2 with the slide in contact with the lower end of the recess 22. Accordingly, it is not possible for the slide to assume an intermediate position where the blocking action of the surfaces 25, 28 or 26, 29 would not be effective. The cam 31 has a V-shaped configuration with its apex spaced outwardly from the side of the slide 21. Similarly, the stirrup spring, intermediate its ends, has a V-shaped projection extending toward the slide and corresponding in configuration to the V-shaped cam. In the position shown in FIG. 2, the projection of the spring 33 holds or biases the slide in its upper position. If the slide is pushed downwardly until the apex of the cam 31 passes the apex formed by the projection of the spring 33, the action of the spring will bias the slide in the downward direction and will hold it in that position against displacement. Therefore, it can be readily appreciated that the slide can be positioned in only two different positions.

On the opposite side of the slide 21 from the cam 31, a recess 34 is provided into which one end of an actuating lever 36 is engaged. The lever 36 is pivotally mounted on the housing 6 by means of a pin 35 which is located intermediate the ends of the lever. The lever 36 extends outwardly through a slot 37 formed in the housing 6 so that its end opposite the end located in the recess 34 extends outwardly from the housing 6. Articulated to the outwardly projecting end of the lever 36 is a hat-shaped actuating button 38 having a surface generally conforming to the surface along the periphery of the housing. In FIG. 2, the button 38 is shown in full lines when the slide is in the upper position and is shown in dot-dash lines when the slide has been moved to its lower position. In these two positions of the button 38, it is in surface contact with the periphery of the housing 6.

What is claimed is:

1. A device including a drive spindle and the device arranged for limiting the revolution of said drive spindle such as for use in the rotary drive for the sliding roof of a motor vehicle, a disk rigidly connected to and extending transversely of said drive spindle, the axis of said disk being disposed eccentrically of the axis of said drive spindle, a ring rotatably mounted on the circumferential periphery of said disk and having gear teeth formed in its outer circumferential peripheral surface, a stationary housing laterally enclosing said disk and ring and having a cylindrically shaped surface concentric with the axis of said shaft and disposed about the circumferential periphery of said ring, said housing having gear teeth formed in said cylindrically shaped surface, the radius of the dedendum circle of said teeth on said housing being larger than the radius of the addendum circle of said teeth on said ring by an amount substantially equal to the eccentricity of said disk relative to the axis of said drive spindle, abutment means on said housing and said ring for limiting the angular movement of said drive spindle, wherein the improvement comprises a slide mounted in said housing and extending transversely of the axis of said drive spindle, said abutment means comprises a pair of spaced abutment members secured to and extending outwardly from said slide toward said ring, said slide being movably positionable within said housing transversely of the axis of said drive spindle for selectively alternatively locating one of said abutment members in the path of said abutment means on said ring with the other said abutment member disposed out of the path of said abutment means on said ring for providing a stop for the angular movement of said drive spindle.

2. A device, as set forth in claim 1, wherein said abutment members on said slide being located on opposite sides of the axis of said drive spindle relative to one another and said slide and abutment members being arranged so that one of said abutment members is always in the path of movement of said abutment means on said ring.

3. A device, as set forth in claim 2, wherein said slide has a slot therethrough elongated in the direction of movement of said slide relative to said drive spindle, and said drive spindle extends through said slot.

4. A device, as set forth in claim 1, wherein said abutment means on said ring comprises a pair of angularly spaced abutment surfaces secured to and extending from said ring toward said slide.

5. A device, as set forth in claim 4, wherein said abutment means comprises a rib secured to and extending outwardly from the face of said ring directed toward said sleeve, said rib having an arcuate configuration being spaced inwardly of the circumferential periphery of said ring and being disposed concentrically of the axis of said ring, and said pair of abutment surfaces each located on an opposite end of said rib.

6. A device, as set forth in claim 1, wherein said slide being positionable between a first position and a second position, and spring means associated with said housing for holding said slide in the one of the first and second positions into which it is located and for biasing said slide from any intermediate position into one of the first and second positions.

7. A device, as set forth in claim 6, wherein said housing having a recess therein extending along one side of the path of movement of said slide, said slide having a V-shaped cam projecting outwardly from the side thereof adjacent said recess into the recess in said housing, and said spring means comprising a stirrup spring positioned within said recess and having a V-shaped projection extending into the path of said cam for engaging said cam in each of the first and second positions of said slide for holding said slide in the one of the first and second positions in which it is located.

8. A device, as set forth in claim 1, wherein said slide being positionable between a first position and a second position, said slide having a notch formed in one of the sides thereof extending in the direction of movement of said slide relative to said drive spindle, and means articulated to said housing and positioned within said notch for moving said slide between the first and second positions thereof.

9. A device, as set forth in claim 8, wherein said means for moving said slide comprises a lever pivoted to said housing and extending at one end into said notch in said slide and having its other end projecting outwardly from said housing so that said outwardly extending end can be manipulated for actuating said lever and displacing said slide between its first and second positions.

10. A device, as set forth in claim 9, wherein a hat-shaped actuating button articulated to the outer end of said lever and disposed in surface contact with the periphery of said housing in each of the first and second positions of said slide.

* * * * *